Oct. 3, 1933.        J. K. NORTHROP         1,929,255
                         AIRPLANE
                    Filed May 10, 1929      2 Sheets-Sheet 1
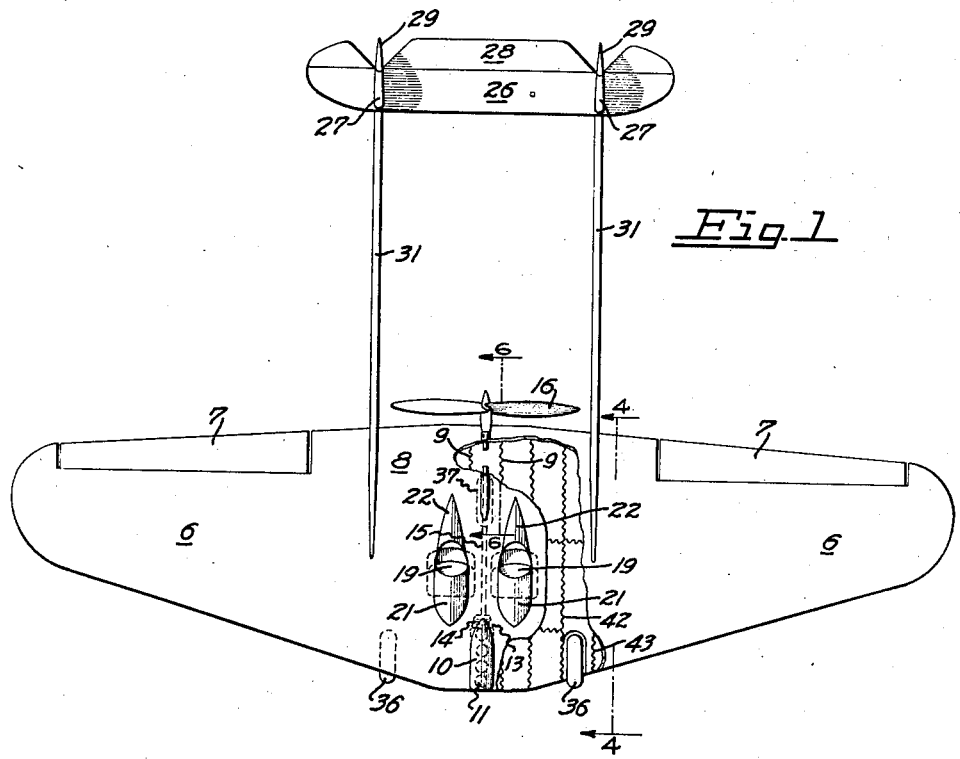
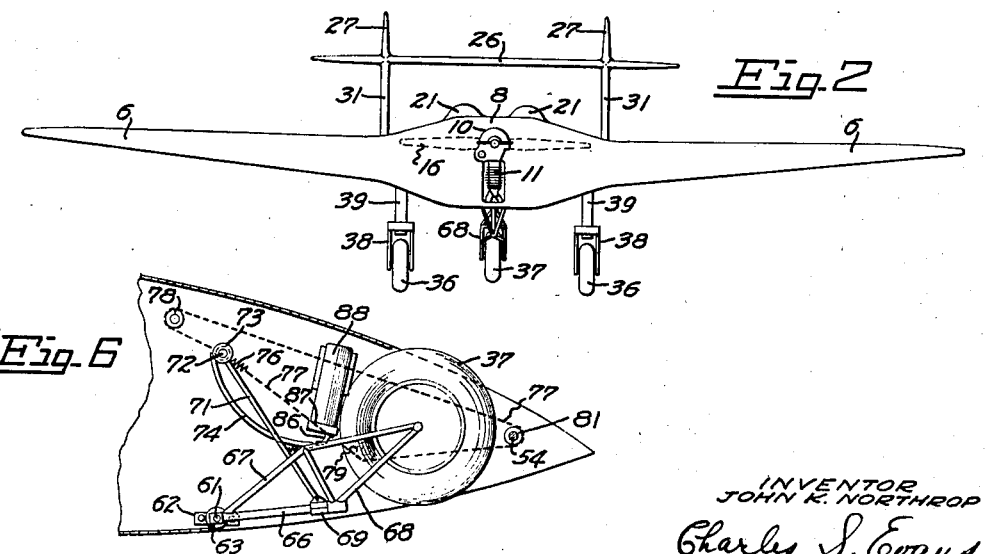
INVENTOR
JOHN K. NORTHROP
BY Charles S. Evans
HIS ATTORNEY Oct. 3, 1933.   J. K. NORTHROP   1,929,255
AIRPLANE
Filed May 10, 1929   2 Sheets-Sheet 2
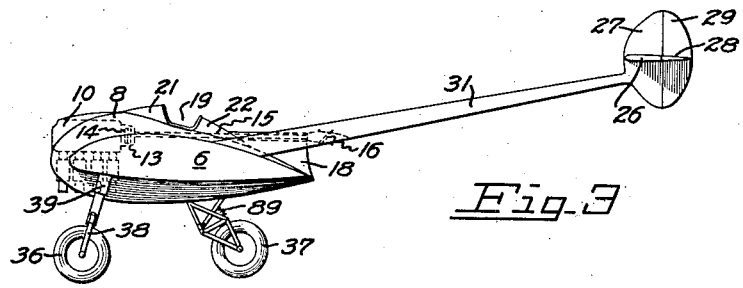
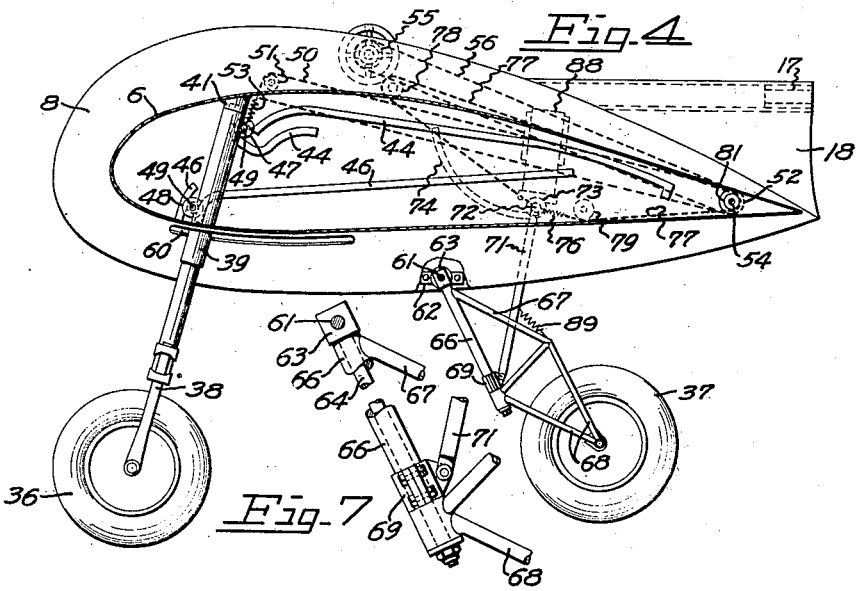
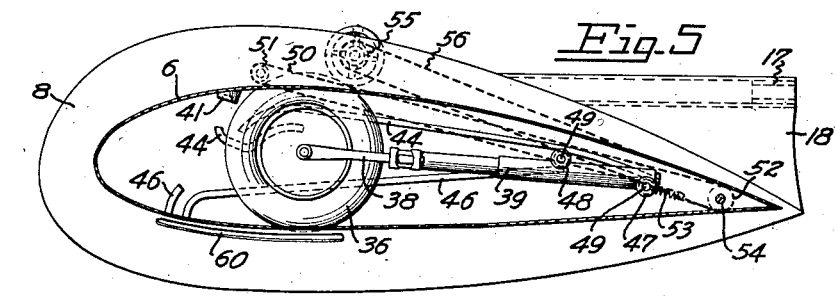
INVENTOR
JOHN K. NORTHROP
BY Charles J. Evans
HIS ATTORNEY.

Patented Oct. 3, 1933

1,929,255

UNITED STATES PATENT OFFICE 1,929,255

AIRPLANE

John K. Northrop, Burbank, Calif., assignor, by mesne assignments, to The Stearman Aircraft Company, Wichita, Kans., a corporation of Kansas Application May 10, 1929. Serial No. 361,974

2 Claims. (Cl. 244—2)

My invention relates to airplanes and particularly to monoplanes, and its broad object is to provide an airplane having the greatest possible efficiency.

With this in view it is one of the objects of my invention to provide an airplane in which the parasitic resistances, that is, the resistances due to surfaces or parts which do not help to sustain the airplane, are reduced to a minimum.

Another object of my invention is to provide an airplane in which sustaining surfaces are utilized with a greater effectiveness than has in the past been possible.

Another object of my invention is to provide a practical retractable landing gear.

Still another object of my invention is to provide an airplane having an extremely low gliding angle.

A further object of my invention is to provide a landing gear which, when on the ground, will have a minimum retarding effect upon the plane, thus allowing it to take off with a very short run.

My invention possesses other objects and valuable features, some of which will be set forth in the following description of my invention which is illustrated in the drawings forming part of the specification. It is to be understood that I do not limit myself to the showing made by the said description and drawings, as I may adopt varying forms of my invention within the scope of the claims.

Referring to the drawings:

Figure 1 is a plan view of an airplane embodying my invention.

Figure 2 is a front elevation of the same airplane.

Figure 3 is a side elevation of the plane with the landing gear shown extended.

Figure 4 is a sectional view taken longitudinally of the airplane and showing the landing gear and its operating mechanism in the extended position. This view is on a larger scale than the preceding figures and parts of the plane not related to the landing gear structure are omitted from the drawings. The plane of the section is indicated by the line 4—4 of Figure 1.

Figure 5 is a sectional view in the same plane as Figure 4 and showing the front landing wheels in the retracted position.

Figure 6 is a fragmentary sectional view taken in a plane indicated by the line 6—6 of Figure 1 and showing the rear landing wheel in the retracted position.

Figure 7 is a detail view, showing upon a somewhat larger scale, a portion of the mechanism shown in Figure 4.

The problem of airplane design is fundamentally that of producing the maximum lifting effort with a minimum expenditure of fuel; and of properly stabilizing and controlling this lifting effort. In order to produce the required lift a surface must be projected through the air. This absorbs power and the resistance to this movement is known as drag. Experiment and careful design of airfoil sections has made it possible to produce sustaining surfaces in which the ratio of lift to drag is as high as 20 to 1 and it is probable that this ratio will improve in future design.

Associated with the lifting surfaces there must be stabilizing and controlling surfaces. These contribute little if any to the actual lift of the airplane. They do add to the drag, however, and for this reason in an efficient design it is important that they be of the best aerodynamic form, and so placed that they operate in an airstream undisturbed by other parts of the plane. Only in this manner can their contribution to parasite drag be kept at a minimum.

Associated with the sustaining and controlling surfaces are other parts whose function is mechanical or structural rather than aerodynamic. These members include the body or fuselage, landing gear, struts or braces for supporting the active surfaces, radiator, engine and the like. These contribute nothing directly to the lift of the plane but they do add to the resistance, contributing further to the parasite drag. With conventional models of airplanes operating at cruising speed the parasite drag will vary between 40% of the total drag in an exceptionally well designed plane to 60 or more percent of the drag in a poorer design.

Broadly considered the airplane of my design comprises a single internally braced cantilever wing having a thick and wide central section in which are housed the power plant and control stations of the plane, and beneath which the landing gear is mounted. Means are provided for retracting the landing gear within the thick wing section so that in flight the parasite drag due to this cause is completely eliminated. Stabilizing and controlling surfaces for the plane are carried on cantilever outriggers behind and above the wing. An airduct is preferably provided substantially parallel to the longitudinal axis of the plane and within the wing, within which the power plant is mounted, thus providing the advantages of an air cooled engine without adding materially to the drag of the plane. The propeller used is preferably of the pusher type and is driven by a propeller shaft extending longitudinally through the wing, and a clutch intermediate between the propeller and motor permit their being disconnected so that in landing the propeller may be allowed to run free, thereby greatly reducing the gliding angle. This structure, moreover, allows the motor to be mounted adjacent the leading edge of the wing, while using the pusher propeller which gives added efficiency and permits undisturbed air flow across the wing section, thereby greatly increasing its lifting efficiency.

As used in this specification, the terms "thick section" or "thick wing" are not merely relative, but refer specifically to wing sections having a thickness greater than 10% of their chord dimension, and capable of sustaining themselves without external bracing.

It will be apparent that the practicality of a design of the type described meets its severest test in a small plane, since a large craft with a wide and correspondingly deep wing structure offers more room for the necessary motive and control apparatus and for passenger space. I have accordingly chosen, to illustrate my invention, a two seater airplane of the smallest type which it is ordinarily commercially desirable to construct, and from which the design of larger planes of similar characteristics may readily be deduced.

The plane comprises a single wing having tapered end sections 6 and ailerons 7, whose construction is preferably that described in my co-pending application on an aerofoil, Serial Number 303,668, filed September 4th, 1928. Between the wing sections 6 is a central section 8 which is also of airfoil cross section and whose outer portions taper somewhat more abruptly than the end section, but still gradually. As is described in my previous application, the tip sections are built up of channels whose flanges form the sustaining surfaces of the airfoil and bear its tensional and compressional stresses, the whole forming what is in effect a box girder. The central section is also of a box girder type, but because of the greater depth of the webs or bulkheads extending vertically through the section, these webs are preferably provided with additional stiffening means, such as the vertical corrugations shown in Figure 1, the skin of the plane being cut away in the drawings to show this construction. As is the case with the tip section the compression and tension stresses are carried by the skin of the plane. The construction of this portion of the wing is more fully described in my co-pending application.

Two of the vertical webs or bulkheads 9—9 are positioned one on either side and closely adjacent to the longitudinal axis of the plane forming a passageway or duct.

Mounted with its cylinders within this duct is an inverted motor 11 of the cylinders-in-line type. In the present case a small portion of the crank case extends above the airfoil section, this portion of the crank case being housed in the streamline cowing 10. Baffles (not shown) may be disposed within the duct to direct the air flow therethrough equally across all of the cylinders and out through an exhaust port in the bottom of the wing.

Immediately back of the motor and mounted integrally with the crank case is a housing 13 within which is enclosed a clutch 14 of well known automotive type. The clutch drives a propeller shaft 15 which is in the plane of the crank shaft of the motor and extends through the duct to a point slightly behind the trailing edge of the wing, where it carries a propeller 16. The rear end of the propeller shaft is supported by a bearing 17 carried by the fin 18.

The two control stations or cockpits 19 are positioned symmetrically on either side of the air duct. Adjacent the seats 19 for pilot and passenger the cockpits are provided with control mechanism which, since it is of standard type, is not shown. Windshield 21 and rear cowling 22 is provided for deflecting the air stream and so protecting pilot and passenger. It is to be noted that noise, fumes and oil from the engine are below and separated from the occupants of the plane and are deflected away from them, so that the plane is not only exceptionally clean, but is also exceptionally free from noise so far as its occupants are affected.

A stabilizer-controller assembly, comprising the horizontal stabilizer 26, vertical stabilizer 27, elevator 28, and rudders 29 are mounted on the tubular streamlined outriggers or booms 31, within which run the usual control cables, and which hold the tail structure well behind and slightly above the wing. This structure has an extremely high aspect ratio, that is, its dimension along the longitudinal axis of the plane is small as compared with the dimension normal to this axis, which gives the structure very high efficiency. Its construction is preferably of the all-metal channel type which is used for the wing.

Mounted below the wing so that it may be extended for landing or retracted for flying is the landing gear, which in this case comprises the two front wheels 36 and a rear wheel 37. The front wheel is mounted in a fork 38 which is carried by a telescopic strut 39, within which is mounted a shock absorber of standard construction. The end of the strut bears against an abutment 41, mounted adjacent the upper surface of the wing between the longitudinal bulkheads 42 and 43. Secured to these bulkheads are guide rails 44 and 46 which engage rollers 47 and 48 carried on shafts 49 secured to the strut 39. A roller chain 50 running over an idler sprocket 51 and a drive sprocket 52 is attached to the strut adjacent its upper end by a spring 53. The drive sprocket 52 is mounted on a shaft 54, driven by a sprocket 55 and chain 56, from the cockpit. By this means the strut may be pulled back along the guide rails, which rotate it from the almost vertical landing position shown in Figure 4 to the substantially horizontal flying position shown in Figure 5, and lifting the landing wheel through the port 60 to its position completely housed within the thick wing.

The rear landing wheel 37 is retractable in a very similar manner. A short shaft 61 is journaled across the longitudinal axis of the plane and at right angles thereto in the bearings 62. The shaft carries a block 63, to which is secured a shaft 64 extending radially from the shaft 61. Journaled on the shaft 64 is a tubular sleeve 66 which forms one member of a trussed frame 67 carrying the fork 68 on which the wheel 37 is mounted. Surrounding the sleeve adjacent its lower end is a bearing 69, and pivotally connected to this bearing is the apex of a triangular strut 71. Journaled on the transverse shaft 72 which forms the base of the strut are rollers 73 which engage curved tracks 74 secured to the bulkhead 9. Attached to the strut 71 by the spring 76 is a roller chain 77 which passes over guide sprockets 78 and 79, and is driven by a sprocket 81 carried by the shaft 54 which actuates the front wheel retracting mechanism. Actuation of this shaft pulls the rollers 73 along the track 74 pulling the wheel 37 up within the wing and the fin 18 as shown in Figure 6; or extending it into landing position as shown in Figure 4. When the wheel is extended the transverse shaft 72 of the strut 71 is engaged by the hooked abutments 86 carried on the end of the pistons 87 of the shock absorber cylinders 88 which are mounted on the bulkhead 9. Springs 89 connect the frame 67 to the strut 71 and tend to hold the wheel 37 parallel with the wheels 36 and the axis of the plane. The pivotal mounting of the sleeve 66 permits a caster action of the wheel and facilitates steering when the plane is taxiing.

Certain aerodynamic characteristics of the plane may now be considered. It will be noted that the wing of the plane tapers outwardly from the central section in plan-form as well as in elevation. This involves a slight sacrifice in aspect ratio, but it permits the housing of the necessary parts within a wing section whose thickness is but 30 to 40% of its chord length. Wind tunnel tests show such sections to have a lift/drag ratio of from 10 to 12. In the present case a more favorable ratio is attained, since the section has not the sharply cut off ends of a wind tunnel sample, but tapers gradually into a section of conventional form, thus eliminating excessive end losses and turbulence. The tip section 6 may be designed with a lift/drag ratio of approximately 20. In flight and with the landing gear retracted the parasite drag is only that due to the motor, the cockpit cowlings, the tail surfaces and to the spars 31, so that the lift-drag ratio of the entire plane may be made 14 to 16 or even more as contrasted with a similar ratio of from 7 to 10 for the best planes of conventional design. This gain is due in part to the small area of the parasitic surfaces, but it is due in even greater extent to the fact that there is an uninterrupted air flow over the wings and the parasitic surfaces and parts are not subjected to air turbulence or interference with each other which increases their resistive effects. Such effects, which occur, for example, at the point of junction between the wing and body or fuselage of the standard plane, are difficult of measurement and are not well understood but are known to be a large portion of the whole parasite resistance.

The construction of the plane permits the use of a pusher propeller, or, in larger planes, of a plurality of such propellers, and still permits the motor to be mounted adjacent the leading edge of the wing. Therefore the center of mass and center of pressure of the plane will coincide without the use of excessive sweep-back in the wing with its attendant inefficiency. The ordinary tractor propeller, mounted closely in front of the leading edge of the wing, not only loses as much as 25% of its own efficiency, but by disturbing the air flow over the wing greatly decreases the efficiency of the latter as well. Thus the efficiency of both propeller and wing are increased by the present structure. The advantage of the retractable landing gear is obvious since a conventional landing gear may be responsible for as much as 40% of the total parasite resistance in a conventional type of airplane. The use of a clutch between the motor and the propeller, so that in gliding the latter may be released to turn freely in the airstream without being forced to rotate the motor against its compression, decreases the angle of glide with a corresponding increase in safety in case of a motor failure.

It is to be noted that the factors and advantages just recited are largely interdependent. The use of the thick wing to house the cockpit and power plant also allows the housing of the retractable landing gear while permitting it to be spaced widely enough to give ample stability in landing. At the same time it permits the retractive motion to be in a plane parallel to the longitudinal axis of the airplane. This is manifestly a problem of great difficulty if the attempt is to be made to house the landing gear within the customary narrow fuselage. Eliminating the fuselage with its large skin friction and sharp break in surface where the wings are attached, permits the controlling surfaces to be carried upon the spaced outriggers. Moreover with the fuselage removed space is provided for the use of the pusher propeller, which not only gives the aerodynamic advantages which have previously been mentioned but also locates the propeller in a protected situation and eliminates a fruitful cause of accident. The propeller is protected from the side by the outriggers 31 and from below by the rear landing wheel 37 and its supporting members. The inversion of the motor and placing it in the forward part of the thick wing facilitates the cooling problem, removes a large part of the noise which would otherwise be experienced by the occupants of the plane and facilitates the use of the clutch with its consequent decrease in gliding angle.

The loading of the plane is closely centered about its longitudinal axis, the major load all being included within the area defined by the landing gear. The extremely efficient control surfaces form the greatest outboard load, and because of their lightness and the fact that they are carried on a full cantilever support, the loads which are ordinarily carried by a tail skid are all taken by the rear wheel, and the great ground resistance offered by the tail skid in landing and taking off are accordingly eliminated.

Another object obtained by the light outrigger supported tail surface is that the attitude of the plane upon the ground is nearly the same as that in the air, so that the plane will take off practically of its own accord as soon as it acquires the requisite speed. This, in addition to the elimination of tail skid friction, greatly accelerates the take off, as depression of the elevators is unnecessary, and air resistance from this cause is absent.

I claim:

1. An airplane landing gear comprising a frame pivotally connected to the body of the airplane, a strut connected at the outer end of said frame, a guide rail and a shock absorbing means fixed on the frame of the airplane, and means for optionally positioning the inner end of the strut against said shock absorbing means or moving it along the guide rail to retract the landing gear.

2. An airplane landing gear comprising a landing element, a strut connected to said element and bodily movable from and to a substantially upright position, a fixed abutment against which the strut engages in the substantially upright position, means for moving the strut, a pair of guide rails independent of the abutment, and means on the strut contacting with the guide rails for guiding the strut into and out of engagement with the abutment.

JOHN K. NORTHROP.